United States Patent [19]

Connor

[11] Patent Number: 4,984,930
[45] Date of Patent: Jan. 15, 1991

[54] BALL JOINT STUD ASSEMBLY

[75] Inventor: Frederick D. Connor, Herongate, England

[73] Assignee: Ford Motor Company, Dearborn, Mich.

[21] Appl. No.: 382,867

[22] Filed: Jul. 20, 1989

[30] Foreign Application Priority Data

Jul. 22, 1988 [GB] United Kingdom ............... 8818081

[51] Int. Cl.$^5$ .............................................. F16B 2/02
[52] U.S. Cl. ................................ 403/290; 403/344; 403/122
[58] Field of Search ............... 403/290, 289, 344, 122, 403/134, 131, 373, 141

[56] References Cited

U.S. PATENT DOCUMENTS

| | | | |
|---|---|---|---|
| 3,109,663 | 11/1963 | Phillips, Jr. ..................... | 403/344 X |
| 3,846,742 | 11/1974 | Ettinger .......................... | 403/290 X |
| 4,154,546 | 5/1979 | Merrick et al. ................... | 403/134 |
| 4,162,859 | 7/1979 | McAfee .......................... | 403/122 X |
| 4,220,418 | 9/1980 | Kondo et al. . | |
| 4,557,470 | 12/1985 | Link ............................... | 403/344 X |
| 4,848,951 | 7/1989 | Boogerman et al. ............ | 403/344 X |
| 4,877,050 | 10/1989 | Harris ............................. | 403/344 X |

FOREIGN PATENT DOCUMENTS 599410  3/1948  United Kingdom .
2103532  2/1983  United Kingdom .

Primary Examiner—Peter M. Cuomo
Attorney, Agent, or Firm—Randolph A. Smith; Roger A. May

[57] ABSTRACT

A ball joint stud assembly comprising a shank having a ball formed at one end thereof, the shank having first and second axially separated surfaces with the first surface, which is located furthest from the ball, having a diameter smaller than the second surface, and the surfaces are separated by a circumferential groove. The assembly also includes a mounting component for receiving and securing at least a portion of the shank therein. The mounting component has (1) a first bore for receiving the shank, (2) a second bore perpendicular to the first bore and intersecting the first bore, and 3) a slot projecting radially from the first bore to an edge of the mounting component such that the slot intersects with the second bore. A clamping bolt is also included in the assembly for reducing the diameters of the first bore and securing the shank therein upon tightening of the clamping bolt. Further a portion of the clamping bolt is disposed in the second bore and engages and additionally secures the shank by being disposed in the circumferential groove.

10 Claims, 1 Drawing Sheet

BALL JOINT STUD ASSEMBLY

BACKGROUND OF THE INVENTION

1. Field of the Invention

The present invention relates to a ball joint stud assembly for securely mounting the ball part of a ball and socket joint.

2. Discussion of the Related Art

Ball and socket joints are used, for example, in suspension linkages where it is important that the ball joint stud be securely and reliably mounted in its socket.

An example of a suspension ball joint mounting mechanism known in the art includes a ball joint stud assembly having its ball portion pivotally supported by spherical seats fitted in the corresponding sockets in a support seat assembly suitably secured to a suspension arm. The shank portion of the ball joint stud assembly is passed through the forked portion of the steering knuckle and is secured by a suitable means, for example, by screwing a nut onto the corresponding threaded portion or by using a clamping bolt to tighten the forked portion of the steering knuckle.

U.S. Pat. No. 4,220,418 to Kondo et al. discloses a suspension ball joint mounting mechanism which illustrates the use of a clamping bolt for bolting the shank portion to the forked clamping portion of the steering knuckle.

However it has been found that when assembling this type of ball joint stud assembly, i.e., one using a clamping bolt to tighten the shank, an improper assembly between the shank and the mounting mechanism is possible. This improper assembly can occur because the diameter of the bore receiving the shank and the diameter of the shank are constant. Thus when the person assembling the device places the shank only in part of the bore, up to a maximum location where the end of the shank is located adjacent to the opening for the clamping bolt, the clamping bolt can be inserted and the mounting mechanism can be tightened. The shank is thereby held in the mounting mechanism in an improper position and the clamping bolt does not perform its additional function of retaining the shank by engaging the circumferential groove formed in the shank.

SUMMARY OF THE INVENTION

In view of the problems caused by incorrect mounting of the shank in the mounting mechanism, it is an object of the present invention to provide an improved ball joint stud assembly which will not allow improper assembly in the manner described above.

The above and other objects of the present invention may be achieved by a ball joint stud assembly comprising a shank having a ball formed at one end thereof, the shank having first and second axially separated surfaces with the first surface, which is located furthest from the ball, having a diameter smaller than the second surface, and the surfaces are separated by a circumferential groove The assembly also includes a mounting component for receiving and securing at least a portion of the shank therein. The mounting component has (1) a first bore for receiving the shank, (2) a second bore perpendicular to the first bore and intersecting the first bore, and (3) a slot projecting radially from the first bore to the edge of the mounting component such that the slot intersects with the second bore. A clamping bolt is also included in the assembly for reducing the diameters of the first bore and securing the shank therein upon tightening of the clamping bolt. Further a portion of the clamping bolt is disposed in the second bore and it engages and additionally secures the shank by being disposed in the circumferential groove.

The two spaced cylindrical sections are preferably separated by a shoulder and this shoulder is positioned such that when the shank is inserted into the first bore, a leading edge of the second surface engages the shoulder to accurately locate the shank in the first bore.

The circumferential groove of the shank is shaped so that it has a cross section in the form of an arc of a circle and the circle has a radius equal to a predetermined radius of the second bore.

Further, the relative diameter of the first surface and the larger diameter section of the first bore are dimensioned such that when the first surface is located in the larger diameter section of the first bore, the clamping bolt is prohibited from tightening the mounting component sufficiently to grip the shank.

BRIEF DESCRIPTION OF THE DRAWINGS

The invention will now be described further, by way of example, with reference to the accompanying drawings, in which.

DESCRIPTION OF THE PREFERRED EMBODIMENTS

Figure 1:
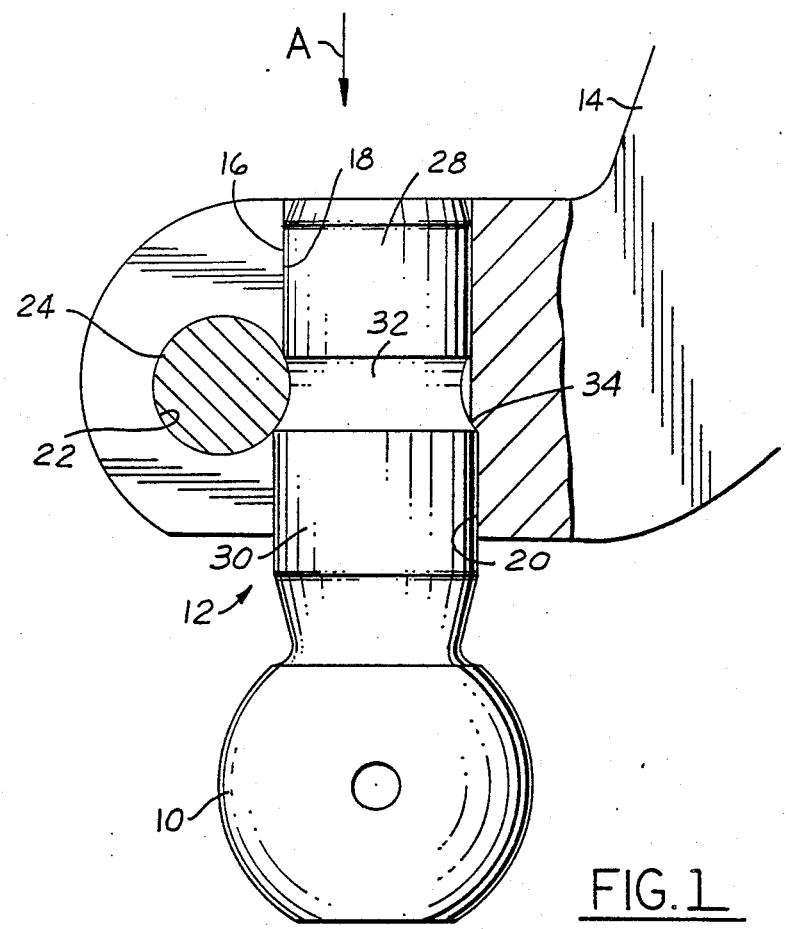
FIG. 1 is a side elevational view, partially in section, of the ball joint stud assembly taken along line I—I of FIG. 2, according to the present invention.
Figure 2:
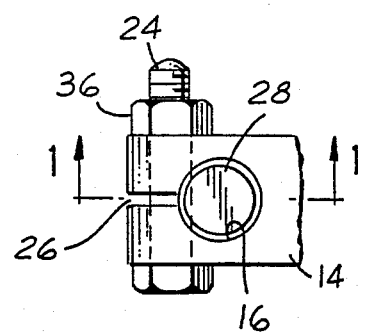
FIG. 2 is a top plan view of the ball joint stud assembly, taken in the direction of arrow A in FIG. 1, according to the present invention.

FIGS. 1 and 2 disclose a ball joint stud assembly with the ball joint shank portion 12 in the assembled position where it is secured in the arm 14. The ball joint stud assembly includes a ball 10 on the end of the shank 12. The shank 12 has a narrow diameter cylindrical portion 28 and a larger diameter cylindrical portion 30. These two portions 28 and 30 are separated by a neck 32 which is in the form of a circumferential groove. The groove or neck 32 has a cross section in the form of an arc of a circle.

To receive the shank 12, the arm 14 has a first bore 16 which has a stepped configuration. The bore 16 includes a smaller diameter portion 18 and a larger diameter portion 20. These portions 18 and 20 are dimensioned so that they are slightly larger than the corresponding diameters of the respective shank portions 28 and 30 and therefore allow for easy placement of the shank 12 into the first bore 16.

The smaller and larger diameter portions 18 and 20 of the first bore 16 are separated from each other by a shoulder 34. Thus when the shank 12 is inserted into the arm 14, the leading edge of the larger diameter portion 30 of the shank 12 comes into positive engagement with the shoulder 34 and this allows for fast and proper placement of the shank 12 in the arm 14.

A second bore 22 is formed in the arm 14 such that it extends perpendicular to the first bore 16. Following insertion of the shank 12, a clamping bolt 24 is inserted into the second bore 22. The clamping bolt 24 extends across a slot 26 which has been cut from the material of the arm 14. The slot 26 extends radially from the first bore 16 to the edge of the arm 14. When the shank 12 is positioned correctly in the arm 14, such that the leading edge of the larger diameter portion 30 of the shank 12 is in engagement with the shoulder 34, the edge of the clamping bolt 24 engages the neck 32 of the shank 12 and holds the shank 12 in the arm 14.

After insertion of the clamping bolt 24 into the second bore 22, a nut 36 is placed on the end of the clamping bolt 24 and is tightened so that the width of the slot 26 is decreased and the portions 18 and 20 of the arm 14 clamp the respective portions 28 and 30 of the shank 12.

This construction of the ball joint stud assembly prevents misassembly of the shank 12 in the arm 14 as follows. First the shank 12 is placed in the first bore 16 until the leading edge of portion 30 abuts the shoulder 34. The clamping bolt 24 is then inserted into the second bore 22. Since the second bore 22 intersects with the first bore 16, the mere act of placing the clamping bolt 24 into the second bore 22 locks the shank 12 in place. If, however, the shank 12 is slightly misaligned, the shank 12 will be drawn up into the first bore 16 as the clamping bolt 24 is inserted. Then tightening of the nut 36 on the clamping bolt 24 draws the sides of the slot 26 together and thus the portions 18 and 20 hold the respective portions 28 and 30 of the shank 12 securely in the arm 14.

If the shank 12 is only partially inserted into first bore 16 such that the narrower portion 28 of the shank 12 is only disposed in the larger diameter portion 20 of the first bore 16 and the clamping bolt 24 is then inserted entirely above the shank 12, tightening of the nut 36 on the clamping bolt 24 will not cause the shank 12 to be held in the arm 14. This is because the first bore 16 cannot close sufficiently enough for the larger diameter portion 20 of the first bore 16 to grip the smaller diameter portion 28 of the shank 12.

Upon initial insertion of the shank 12, the narrower shank portion 28 will enter the wider diameter portion 20 of the first bore 16 with a loose fit as described above. Upon continued insertion, the shank portion 28 will pass adjacent the second bore 22 thereby not allowing the clamping bolt 24 to be inserted until the shank 12 is correctly positioned in the arm 14. This helps to ensure that the shank 12 and the arm 14 can only be assembled correctly.

It is preferable that when the assembly is completed, there is no clearance between the bore portions 18 and 20 and the shank portions 28 and 30. The construction described above allows this condition to be achieved without making the actual assembly process unduly difficult.

The bore portions 18 and 20 and the shank portions 28 and 30 will normally be concentric. It is also preferable that the larger diameter part of the assembly is in the higher load position, which is nearer the ball portion 10, than the smaller diameter part.

The present invention has been described with reference to certain preferred embodiments and those skilled in the art, in view of the present disclosure, will appreciate that numerous alternative embodiments of the invention are within the scope of the following claims.

What is claimed is:

1. A ball joint stud assembly comprising:
   a shank having a ball formed at one end thereof, said shank having first and second axially separated surfaces with said first surface, which is located furthest from said ball, having a diameter smaller than said second surface, and with said surfaces being separated by a circumferential groove;
   a mounting component for receiving and securing at least a portion of said shank therein, said mounting component having:
      a first bore for receiving said shank, said first bore having axially spaced sections of different diameters which approximately correspond to said first and second surfaces of said shank;
      a second bore perpendicular to said first bore and intersecting said first bore; and
      a slot projecting radially from said first bore to an edge of said mounting component such that said slot intersects with said second bore; and
   a clamping bolt means for reducing the diameters of said first bore and securing said shank therein upon tightening of said clamping bolt means, wherein a portion of said clamping bolt means is disposed in said second bore and engages and additionally secures said shank by being disposed in said circumferential groove.

2. A ball joint stud assembly as defined in claim 1, wherein said first and second axially separated surfaces are cylindrically shaped.

3. A ball joint stud assembly as defined in claim 2, wherein said first and second axially separated cylindrical surfaces have a right circular form.

4. A ball joint stud assembly as defined in claim 1, wherein said axially spaced sections of said first bore are cylindrically shaped.

5. A ball joint stud assembly as defined in claim 4, wherein said axially spaced cylindrical sections have a right circular form.

6. A ball joint stud assembly as defined in claim 1, wherein said axially spaced sections of said first bore are separated by a shoulder positioned such that when said shank is inserted into said first bore, a leading edge of said second surface engages said shoulder to locate said shank in said first bore.

7. A ball joint stud assembly as defined in claim 1, wherein said shank has a longitudinal axis and said first and second surfaces as well as said axially spaced sections of said first bore are all concentric about the longitudinal axis of said shank.

8. A ball joint stud assembly as defined in claim 1, wherein said second bore has a predetermined radius and said circumferential groove has a cross section in the form of an arc of a circle having a radius equal to said predetermined radius of said second bore.

9. A ball joint stud assembly as defined in claim 1, wherein the relative diameter of said first surface and the larger diameter section of said first bore are dimensioned such that when said first surface is located in the larger diameter section of said first bore, said clamping bolt is prohibited from tightening said mounting component sufficiently to grip said shank.

10. A ball joint stud assembly comprising:
    a shank having a ball formed at one end thereof, said shank having first and second axially separated cylindrical surfaces with said first surface, which is located furthest from said ball, having a diameter smaller than said second surface, and with said surfaces being separated by a circumferential groove;
    a mounting component for receiving and securing at least a portion of said shank therein, said mounting component having:
       a first bore for receiving said shank, said first bore having axially spaced cylindrical sections of different diameters which approximately correspond to said first and second surfaces of said shank, and said axially spaced cylindrical sections of said first bore are separated by a shoulder positioned such that when said shank is inserted into said first bore, a leading edge of said second surface engages said shoulder to locate said shank in said first bore;

a second bore perpendicular to said first bore and intersecting said first bore; and a slot projecting radially from said first bore to an edge of said mounting component such that said slot intersects with said second bore; and a clamping bolt means for reducing the diameters of said first bore and securing said shank therein upon tightening of said clamping bolt means, wherein a portion of said clamping bolt means is disposed in said second bore and engages and additionally secures said shank by being disposed in said circumferential groove.

* * * * *